(12) United States Patent
Chan

(10) Patent No.: US 7,416,404 B2
(45) Date of Patent: Aug. 26, 2008

(54) FEED INJECTOR FOR GASIFICATION AND RELATED METHOD

(75) Inventor: Henry Choisun Chan, Bellaire, TX (US)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 11/107,811

(22) Filed: Apr. 18, 2005

(65) Prior Publication Data
US 2006/0231645 A1 Oct. 19, 2006

(51) Int. Cl.
*F23M 9/06* (2006.01)
*B05B 7/10* (2006.01)

(52) U.S. Cl. .................. 431/183; 431/187; 239/403; 366/175.2; 366/338

(58) Field of Classification Search ............. 239/424, 239/403, 404, 405, 406; 366/339, 338, 175.2; 431/182, 183, 187
See application file for complete search history.

(56) References Cited

U.S. PATENT DOCUMENTS

| | | | | |
|---|---|---|---|---|
| 475,297 | A * | 5/1892 | Coates | 239/104 |
| 835,619 | A * | 11/1906 | Isaacs | 366/165.4 |
| 1,513,624 | A * | 10/1924 | Parker | 239/404 |
| 2,784,948 | A * | 3/1957 | Pahl et al. | 366/339 |
| 2,816,518 | A * | 12/1957 | Daggett | 222/145.6 |
| 2,831,754 | A * | 4/1958 | Manka | 366/338 |
| 3,020,026 | A * | 2/1962 | Peeps et al. | 165/156 |
| 3,236,280 | A * | 2/1966 | Greinke | 431/12 |
| 3,794,300 | A * | 2/1974 | Harder | 366/339 |
| 4,014,469 | A * | 3/1977 | Sato | 239/404 |
| 4,068,830 | A * | 1/1978 | Gray | 366/339 |
| 4,108,732 | A * | 8/1978 | Nuttall, Jr. | 366/165.1 |
| 4,130,389 | A * | 12/1978 | Kaburagi et al. | 431/183 |
| 4,197,092 | A * | 4/1980 | Bretz | 48/86 R |
| 4,270,576 | A * | 6/1981 | Takeda et al. | 366/337 |
| 5,405,082 | A * | 4/1995 | Brown et al. | 239/8 |
| 6,431,467 | B1 * | 8/2002 | Joshi et al. | 239/404 |

OTHER PUBLICATIONS

"Analysis and optimization of Kenics mixers," Galaktionov et al., *International Polymer Processing*, Jan. 15, 2003.
Eastman Chemical Company, "Feed Injector Breakthrough for Gasification Reactors," undated.
McMaster University—Chemical Engineering website, Dr. P.E. Wood, "Fluid Mechanics and Heat Transfer," http://www.chemeng.mcmaster.ca/faculty/wood/default.htm, no date.
Chemineer Mixers and Agitators, "Kenics KM Static Mixers," Feb. 23, 2005, http://www.chemineer.com/km.php.

* cited by examiner

*Primary Examiner*—Tony G Soohoo
(74) *Attorney, Agent, or Firm*—Nixon & Vanderhye, PC

(57) ABSTRACT

A feed injector for use in a gasification apparatus comprising plural concentric tubes converging at an outlet tip, at least one interior tube of the plural concentric tubes having a plurality of static, helically-twisted mixing elements fixed to an exterior surface thereof.

19 Claims, 4 Drawing Sheets

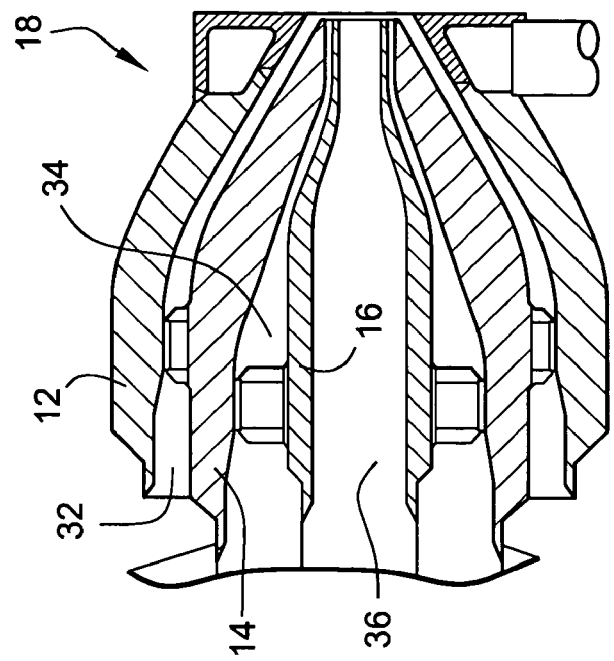
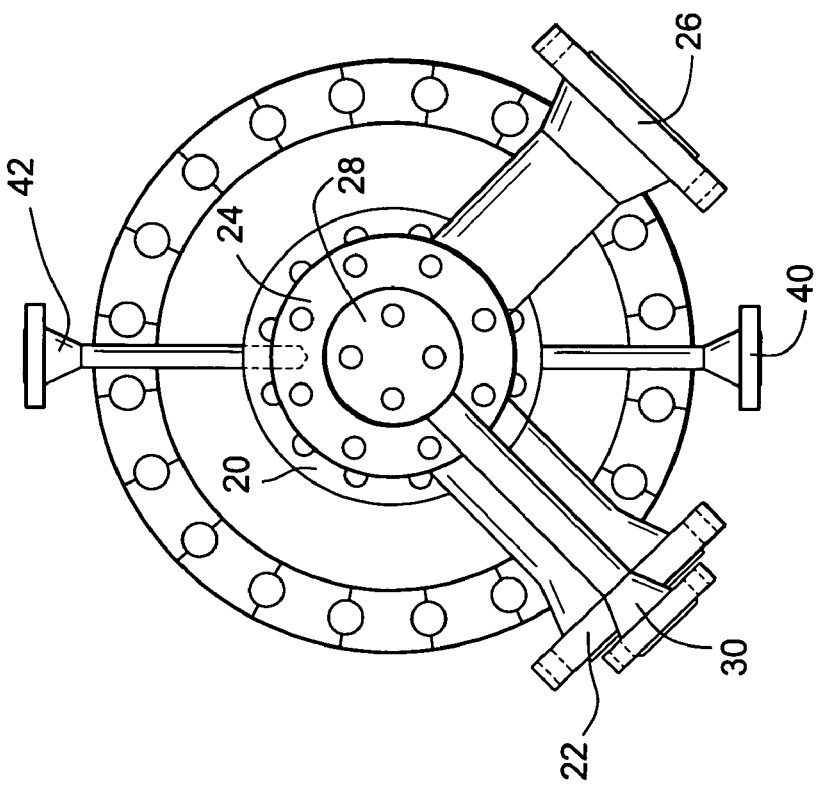

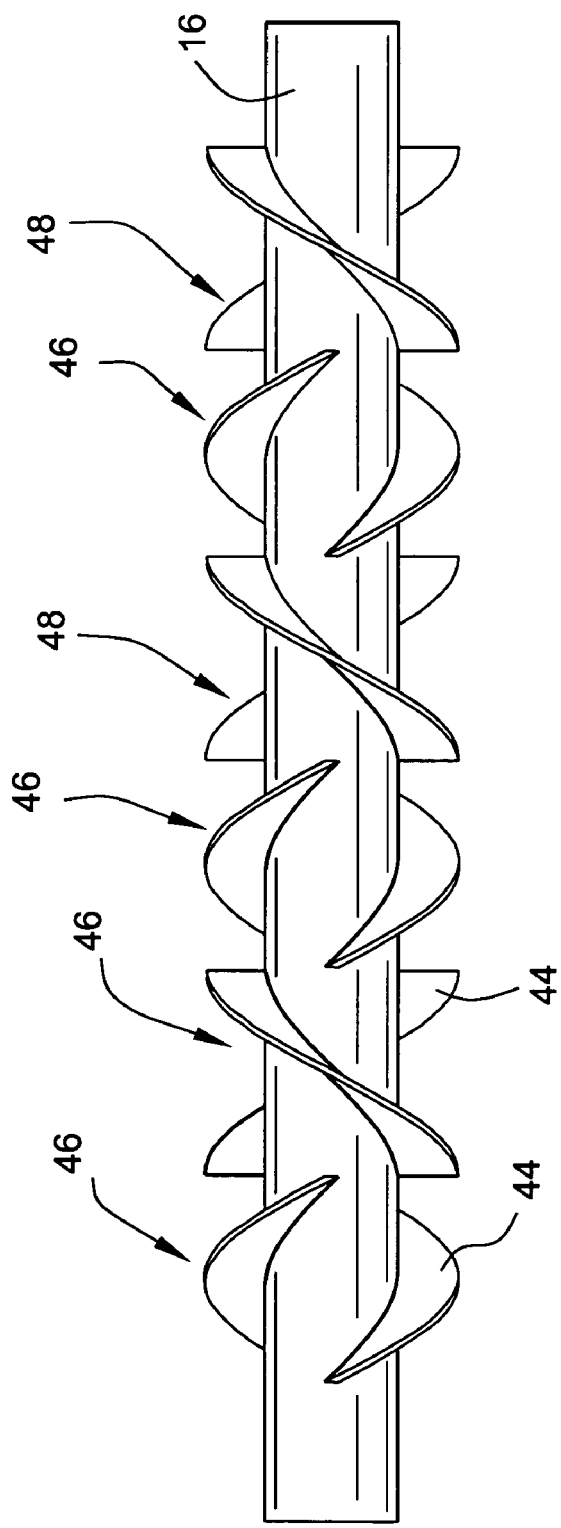
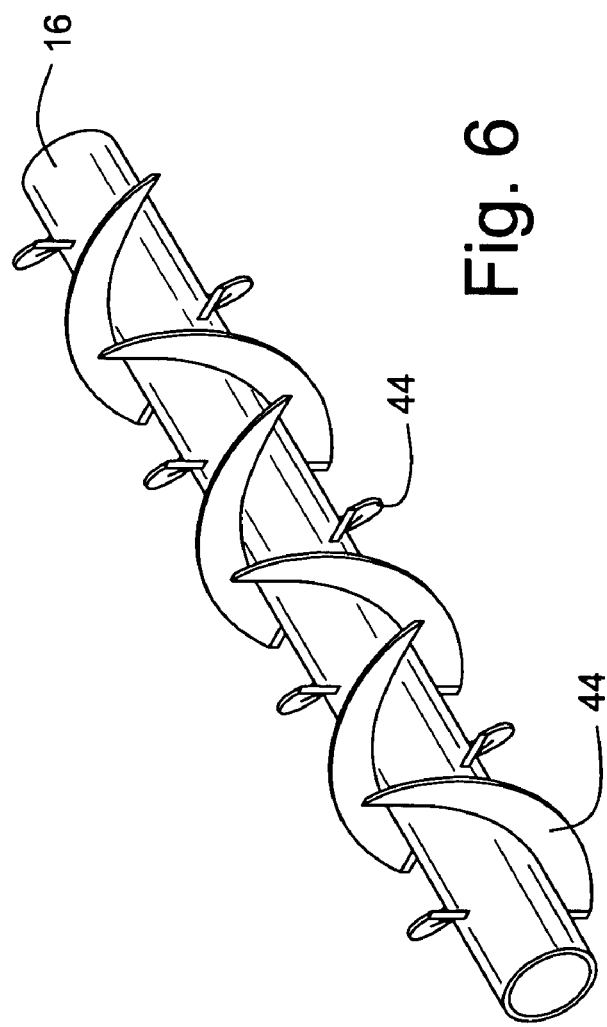

US 7,416,404 B2

FEED INJECTOR FOR GASIFICATION AND RELATED METHOD

BACKGROUND OF THE INVENTION

This invention relates to fuel gasification apparatus typically associated with gas turbine power generation plants, and specifically, feed injectors used to introduce fuel components into a boiler or other combustion device.

Frequently, steam is added to the oxygen stream and steam and/or soot containing black water is added to the fuel stream. This invention is a device designed to enhance the mixing of steam with oxygen and/or to enhance the mixing of fuel and black water streams within the feed injector itself.

BRIEF DESCRIPTION OF THE INVENTION

In accordance with an exemplary embodiment of this invention, a mixing device is incorporated into an otherwise conventional feed injector to enhance better mixing of the feed streams. In the exemplary embodiment, a plurality of static, helically-twisted mixing elements are added to the external surface of the radially innermost tube of the injector to assure that the fuel and black water streams flowing in the middle annulus between the center and intermediate tubes of the injector are homogeneously mixed (emulsified) and uniformly delivered to all points in the vicinity of the injector tip. In the exemplary embodiment, six or more sets of mixer elements are added to the exterior surface of the center tube. These mixing elements are located as far down the center tube or barrel as possible, for example, within about 12 inches from the injector tip. This location minimizes the chance of re-agglomeration of the black water in the fuel. In the exemplary configuration, pairs or sets of mixing elements are arranged in left and right hand directions, with each mixing element extending approximately 180° about the periphery of the center tube.

Accordingly, in one aspect, the exemplary embodiment comprises a feed injector for use in a gasification process comprising plural concentric tubes converging at an outlet tip, at least one interior tube of the plural concentric tubes having a plurality of static, helically-twisted mixing elements fixed to an exterior surface thereof.

In another aspect, the exemplary embodiment comprises a feed injector for use in a gasification apparatus in which streams of different fuel components are mixed, the feed injector comprising a plurality of concentrically arranged tubes defining at least two annular passages and one center passage converging at an outlet tip of the injector; and a plurality of static, helically-twisted mixing elements fixed on an internal one of the plurality of concentrically arranged tubes, the mixing elements arranged in alternating left and right hand pairs of such elements.

In still another aspect, the exemplary embodiment comprises a method of supplying fuel components to a combustion device through a feed injector comprising (a) providing a feed injector comprising plural concentric tubes including an outer tube, an intermediate tube and a center tube forming two annular passages and a single center passage converging at an outlet tip; (b) fixing a plurality of static, helically-twisted mixing elements to at least a peripheral surface of the center tube, within a radially inner one of the two annular passages; and (c) supplying fuel components through the two annular passages and the center passage for discharge through the outlet tip.

The invention will now be described in detail in connection with the drawings identified below.

BRIEF DESCRIPTION OF THE DRAWINGS

FIG. 2 is a left end elevation of the injector shown in FIG. 1;

FIG. 3 is a partial cross section through the tip of the injector shown in FIG. 1;

FIG. 5 is a partial side elevation of the center tube taken from the injector in FIG. 4; and FIG. 6 is a perspective view of the center tube as shown in FIG. 5.

DETAILED DESCRIPTION OF THE INVENTION

Figure 1:
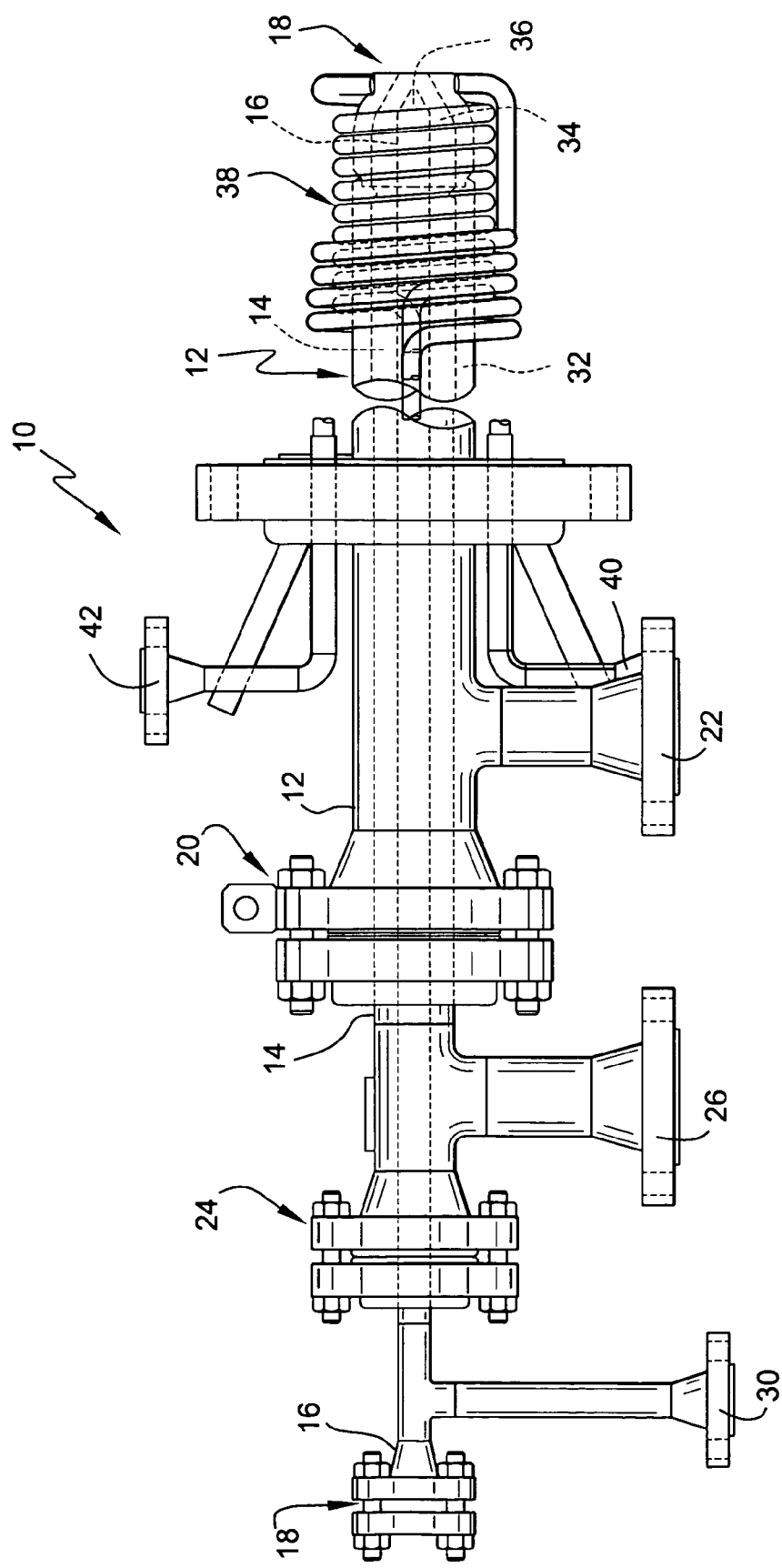
FIG. 1 is a side elevation of a conventional gasifier feed injector.

FIGS. 1-3 illustrate a conventional gasifier feed injector 10 that includes generally a first radially outer tube or barrel 12, a second intermediate tube or barrel 14 and a center tube or barrel 16. The outer barrel 12 extends from the forward tip 18 of the injector rearwardly to an approximate midpoint of the injector where it terminates at a first coupling 20. The first outer barrel is provided with an inlet 22 adjacent the coupling 20. The intermediate barrel 14 extends from the tip 18 rearwardly beyond the coupling 20 to a second coupling 24 at which the barrel 14 terminates. Adjacent the coupling 24, the barrel 14 is provided with an inlet 26. The radially centered tube or barrel 16 extends from the forward tip 18 rearwardly beyond the first and second couplings 20, 24 to a third coupling 28 at which point the center tube or barrel 16 terminates. Adjacent the coupling 28, the center tube or barrel 16 is provided with an inlet 30. Thus, the configuration as described creates three longitudinally arranged, concentric passages or annuli 32, 34 and a center passage 36 that converge at the forward tip 18. In a typical gasification process, inlet 22 serves as the primary inlet for supplying oxygen/steam to the radially outer annulus 32; inlet 26 serves as the primary inlet for supplying fuel/steam or water (blackwater) to the intermediate or middle annulus 34; and inlet 30 serves as a secondary inlet for supplying oxygen/steam to the radially inner or center passage 36. The specific feed components are exemplary only.

A cooling coil 38 surrounds the tip of the injector and water is supplied to the coil via inlet 40 and exits the coil via outlet 42. To this point, the description applies to known gasifier injectors.

Figure 4:
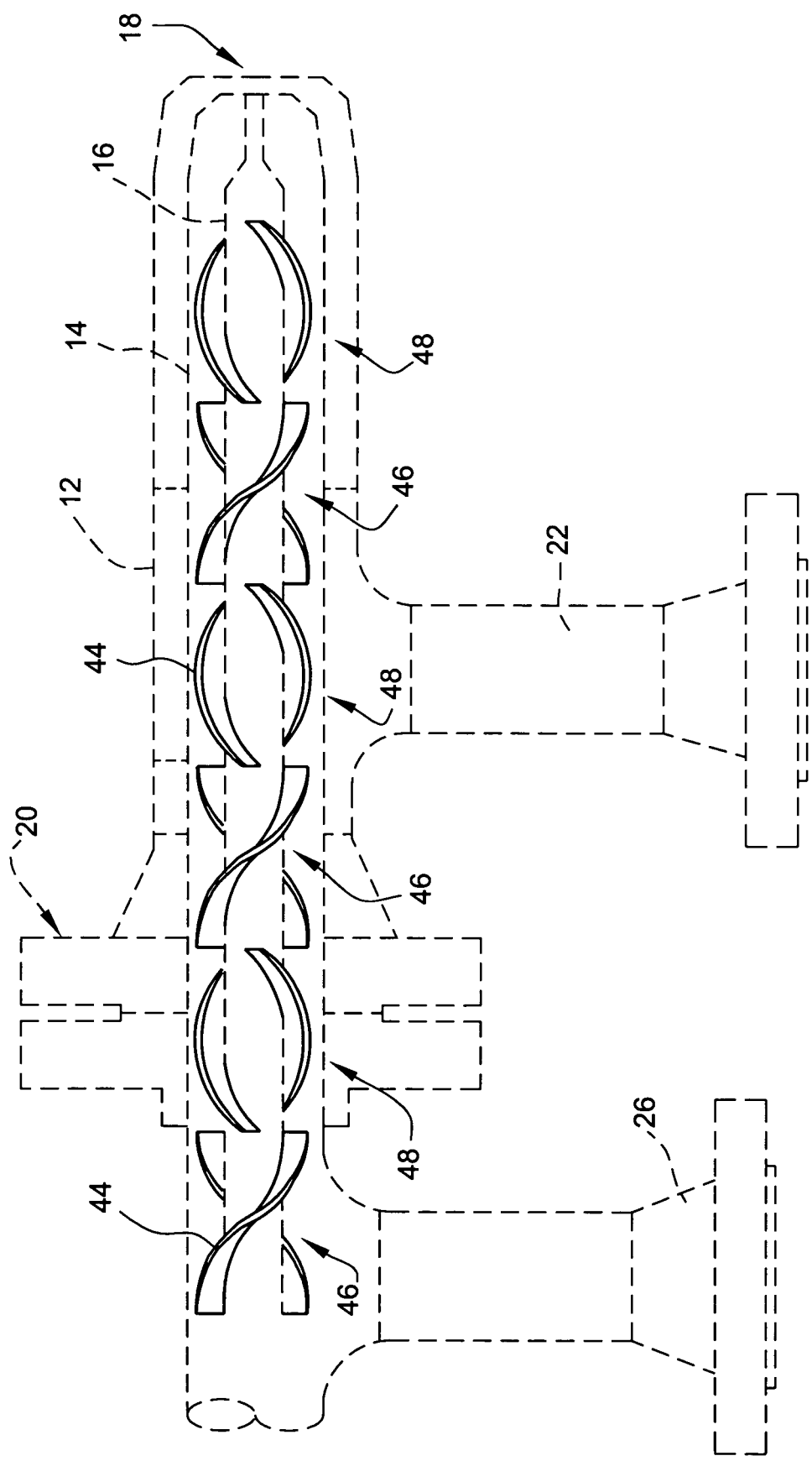
FIG. 4 is a simplified side elevation of a gasifier feed injector incorporating static mixing elements in accordance with an exemplary embodiment of the invention.

In accordance with an exemplary embodiment of this invention, as shown in FIGS. 4-6, static mixing elements 44 are added to the exterior of the center tube or barrel 16. In the exemplary embodiment, mixer elements 44 are secured to the periphery of the center tube or barrel 16. The mixing elements are formed by helically-twisted, rigid plates, each twisted 180° in either a right or left hand direction. As shown in FIGS. 4 and 5, there are 3 sets (or pairs of) left hand elements 46 and 3 sets (or pairs) of right hand elements 48. The twelve elements or plates are located as close as possible to the forward tip 18 of the injector, for example, about 12 inches from the tip. This location minimizes the chance of re-agglomeration of the blackwater in the fuel.

The stator mixing elements may be welded to the exterior surface of tube 16. For all but the last pair of elements adjacent tip 18, each element could have three 1 inch weld segments (two on the ends, one in the middle). The final pair of elements 44 closest the tip 18 should have full welds. This arrangement ensures that if one element 44 detaches from the tube 16, the elements 44 adjacent tip 18 will "catch" it before it exits the tip. In addition, a typical axial length of each element is 5.89 inches, and the axial length of the entire static mixer section applied to the center tube may be on the order of 35-38 inches for an injector that is about 84 inches long. The dimensions are exemplary only, however, and nay vary depending on the injector size, mixing requirements, etc.

It will be appreciated that the number of mixer element sets 46, 48 on the tube 16 and the pitch of the elements, and may be varied depending on the degree of mixing required. It will also be appreciated that mixer elements may also be applied to the exterior of the intermediate tube 14 if desired, to thereby enhance mixing within passage 32 as an alternative to, or in addition to, the mixing elements added to the center tube 16.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A feed injector for use in a gasification apparatus comprising plural concentric tubes converging at an outlet tip of a radially outermost of said concentric tubes, at least one interior tube of said plural concentric tubes having a plurality of static, helically-twisted mixing elements fixed to an exterior surface thereof wherein said plurality of static, helically-twisted mixing elements include plural axially adjacent sets of two helically-twisted plates, extending axially along said at least one interior tube from adjacent said outlet tip at least to a fuel component inlet to said at least one interior tube.

2. The feed injector of claim 1 wherein said plural concentric tubes comprise three tubes including a center tube a radially intermediate tube and a radially outer tube, creating radially outer and radially intermediate annular passages and a center passage, said plurality of static, helically-twisted mixing elements fixed to the exterior surface of at least one of said radially intermediate and center tubes.

3. The feed injector of claim 2 wherein said plurality of static, helically-twisted mixing elements are fixed to the exterior surface of said center tube.

4. The feed injector of claim 2 and further comprising a primary oxygen/steam inlet to said radially outer passage; a secondary oxygen/steam inlet to said center passage; and a fuel/black water/steam inlet to said radially intermediate passages.

5. The feed injector of claim 1 wherein said adjacent sets of helically-twisted plates are arranged in left hand and right hand orientations, respectively.

6. The feed injector of claim 1 wherein each of said helically-twisted plates extends 180° about said exterior surface.

7. The feed injector of claim 1 wherein said static, helically-twisted mixing elements are welded to said exterior surface.

8. The feed injector of claim 1 wherein each of said helically-twisted plates is welded to said exterior surface.

9. The feed injector of claim 1 wherein said outlet tip is surrounded by a cooling coil.

10. A feed injector for use in a gasification apparatus in which streams of different fuel components are mixed, said feed injector comprising a plurality of concentrically arranged tubes including a radially outermost tube defining at least two annular passages and one center passage converging at an outlet tip of the radially outermost tube of the injector; and a plurality of static, helically-twisted mixing elements fixed on an internal one of said plurality of concentrically arranged tubes, said mixing elements arranged in alternating left and right hand pairs of such elements, and extending axially along said internal one of said plurality of concentrically arranged tubes from adjacent said outlet tip a distance more than one third a length dimension of the injector.

11. The feed injector of claim 10 wherein said plural concentric tubes comprises three tubes, including a center tube defining said center passage.

12. The feed injector of claim 11 wherein said plurality of static, helically-twisted mixing elements are fixed to the exterior surface of said center tube.

13. The feed injector of claim 12 wherein each of said helically-twisted plates extends 180° about said exterior surface.

14. The feed injector of claim 12 wherein said static, helically-twisted mixing elements are welded to said exterior surface.

15. The feed injector of claim 10 wherein said outlet tip is surrounded by a cooling coil.

16. A method of supplying fuel components to a combustion device through a feed injector comprising:
    (a) providing a feed injector comprising plural concentric tubes including an outer tube, an intermediate tube and a center tube forming two annular passages and a single center passage converging at an outlet tip of said outer tube;
    (b) fixing a plurality of static, helically-twisted mixing elements to at least a peripheral surface of said center tube, within a radially inner one of said two annular passages said helically-twisted mixing elements extending axially along said center tube from adjacent said outlet tip at least to a fuel component inlet to said center tube; and
    (c) supplying fuel components through said two annular passages and said center passage for discharge through said outlet tip.

17. The method of claim 16 wherein said plurality of static, helically-twisted mixing elements include axially adjacent sets of two helically-twisted plates.

18. The method of claim 17 wherein said adjacent sets of helically-twisted plates are arranged in left hand and right hand orientations, respectively.

19. The method of claim 17 wherein each of said helically-twisted plates extends 180° about said exterior surface.

* * * * *